Patented June 14, 1938

2,120,808

UNITED STATES PATENT OFFICE 2,120,808

CYCLIC BIGUANYL SULPHONIC ACIDS

Hans Z. Lecher, Plainfield, N. J., assignor to The Calco Chemical Company, Inc., Bound Brook, N. J., a corporation of Delaware No Drawing. Application February 21, 1936, Serial No. 65,061

14 Claims. (Cl. 260—125)

This invention relates to new cyclic biguanyl sulphonic acids free from hydroxyl groups and to processes of producing them.

It has been proposed to produce hydroxyl-biguanylnaphthalene sulphonic acids which could be used as passive coupling components in making azo dyes. But these products were of no practical utility and they obviously could not be used to stabilize diazo compounds for which the non-hydroxy products of the present invention are particularly suitable.

The present invention in its broader aspects is not concerned with any particular method of producing the cyclic biguanyl sulphonic acids of the present invention but in more specific aspect to the process of preparing these compounds by reaction of a nonhydroxylated cyclic amino-sulphonic acid with dicyandiamide. The process is generally applicable to non-hydroxylated aromatic amino-sulphonic acids both mono-sulphonic and poly-sulphonic acids, and are also effective with heterocyclic amino-sulphonic acids such as aminopyridine sulphonic acids which are free from hydroxyl groups. Aromatic di-amino mono-sulphonic or disulphonic acids may also be used, producing a bis-biguanyl mono-sulphonic or disulphonic acid. The general reaction between dicyandiamide and the aromatic or heterocyclic amino-sulphonic acid is as follows:

$$H_2N-C(=NH)-NH-C\equiv N + H_2N-Ar \cdot SO_3H \rightarrow$$
$$H_2N-C(=NH)-NH-C(=NH)-NH-Ar \cdot SO_3H$$

The symbol Ar representing the aromatic nucleus, or in the case of a heterocyclic amino-sulphonic acid it is, of course, replaced by the corresponding heterocyclic nucleus.

While the products may be readily transformed into their alkali metal or other salts, the reaction itself takes place only in acid medium and preferably at a pH between 2 and 2.5 which may be maintained by gradual addition of mineral acid during reaction. A small excess, for example 2 to 3 mols of dicyandiamide is also frequently of advantage. The invention will be described in greater detail in conjunction with the following specific examples.

Example I

4-Biguanyl-benzene-1-sulphonic acid

A mixture of 8.6 parts by weight of anhydrous sulphanilic acid, 4.2 parts of dicyandiamide, and 100 parts of water is reflexed for two hours. The starting materials dissolve first, about half an hour later the reaction product begins to precipitate. After the reaction has been finished, the mixture is cooled down to 10°, the biguanyl sulphonic acid is filtered off and washed with water. A further smaller crop can be obtained from the mother liquor.

The 4-biguanyl-benzene-1-sulphonic acid is an "internal salt". It is almost insoluble in cold water, sparingly soluble in hot water. It is almost insoluble in cold glycol, but soluble in hot glycol. It is insoluble in alcohol, glacial acetic acid, acetone, pyridine, benzene. It dissolves in aqueous solutions of bases like caustic soda, soda ash, ammonia, forming the corresponding salts. The sodium salt is readily soluble in water, but little soluble in stronger caustic soda solutions.

The sulphonic acid dissolves in concentrated sulphuric acid and in concentrated nitric acid. It shows a peculiar behavior with dilute mineral acids like hydrochloric, sulphuric, or nitric acid: first it dissolves forming a supersaturated solution of the corresponding salt which after some time, or immediately when seeded, crystallizes. These salts with acids are soluble in water, being hydrolyzed and forming supersaturated solutions of the internal salt which eventually separates. The conversion into the hydrochloride and the reconversion into the internal salt by the aid of an equivalent amount of caustic soda is a convenient method of purification.

Internal salt, calculated for $C_8H_{11}O_3N_5S$: N, 27.23; S, 12.45; found N, 27.0; S, 12.5.

Hydrochloride, calculated for $C_8H_{11}O_3N_5S,HCl$: N, 23.87; Cl, 12.07; found N, 23.53; Cl. 12.07.

By the same method 3- and 2-biguanyl-benzene-1-sulphonic acid can be prepared from metanilic acid and aniline-o-sulphonic acid. The m-compound and its hydrochloride are much more soluble than the p-compound and its hydrochloride. Both hydrochlorides contain two molecules of water of crystallization.

Hydrochloride 3-biguanyl benzene-1-sulphonic acid, calculated for $C_8H_{11}O_3N_5S$, HCl, $2H_2O$: N, 21.25; S, 9.73; Cl, 10.75; found S, 9.98; Cl, 10.42.

Hydrochloride 2-biguanyl-benzene-1-sulphonic acid; found N, 21.6; S, 9.64; Cl, 11.10.

Example II

2-Chloro-5-biguanyl-toluene-4-sulphonic acid

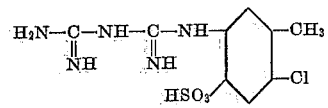

A mixture of 8 parts by weight of 2-chloro-5-amino-toluene-4-sulphonic acid, the equivalent amount of dicyandiamide, and 200 parts of water is refluxed for six hours. Because of the low solubility of the amino acid the solid material does not disappear but changes its appearance gradually. Eventually the mixture is cooled down to room temperature. The precipitate formed is filtered off, washed and dissolved in dilute hydrochloric acid. This solution is quickly filtered, the hydrochloride which separates later is isolated and reconverted to the internal salt by the aid of an equivalent amount of caustic soda.

Internal salt, calculated for $C_9H_{12}O_3N_5Cl$: N, 22.58; S, 10.49; Cl, 11.6; found N, 22.37; S, 10.5; Cl, 11.4.

This compound resembles 4-biguanyl-benzene-1-sulphonic acid in its behavior towards hydrochloric acid. It dissolves in caustic soda solution.

Example III

*2-Biguanyl-naphthalene-1-sulphonic acid*

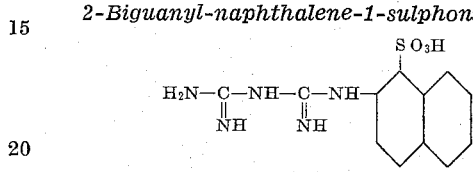

44.6 parts by weight of 2-naphthylamine-1-sulphonic acid (Tobias acid) and 50.4 parts by weight of dicyandiamide (three times the theoretical amount) are heated to boiling with 1200 parts of water. As soon as the boiling point is reached all the ingredients go into solution, and very shortly thereafter a crystalline precipitate of the biguanyl acid begins to separate. The solution is kept at a pH value of 2 to 2.5 by the addition of a few parts of dilute mineral acid from time to time. After refluxing for six hours the mixture is cooled to 10° C. and the crystalline precipitate of the biguanyl sulphonic acid is filtered off and dried. Yield about 95% of theory. If no mineral acid is added the solution gradually becomes alkaline and the yield is lower.

The internal salt is very little soluble in cold water, more in hot water, and it can be recrystallized from water. It is soluble in dilute alkali. Calculated for $C_{12}H_{13}O_3N_5S$: N, 22.79; S, 10.43; found N, 22.27; S, 10.2.

Its behavior towards hydrochloric acid is about the same as that of 4-biguanyl-benzene-1-sulphonic acid. It may be conveniently isolated also in the form of the hydrochloride.

Example IV

*1-Biguanyl-benzene-2,5-disulphonic acid*

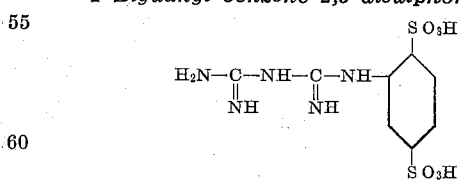

A mixture of 28 parts by weight of the monosodium salt of aniline-2,5-disulphonic acid, the equivalent amount of dicyandiamide, and 100 parts of water is refluxed for three hours and is afterwards cooled down to 15°. The precipitate formed is filtered off, washed with water and recrystallized from water. Calculated for the monosodium salt $C_8H_{10}O_6N_5S_2Na$: C, 26.72; H, 2.81; N, 19.50; S, 17.85; Na, 6.40; found C, 27.2; H, 2.78; N, 19.5; S, 18.57; Na, 6.45.

Example V

*2-Biguanyl-naphthalene-3,6-disulphonic acid*

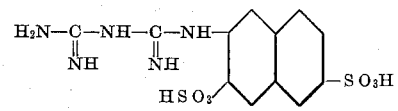

A mixture of the monosodium salt of 2-naphthylamine-3,6-disulphonic acid (amino R acid), the equivalent amount of dicyandiamide, and water is refluxed for five hours. The resulting solution is precipitated by addition of concentrated hydrochloric acid, and the precipitate is recrystallized from water. The compound obtained is the "acid internal salt" and is not a sodium salt. Calculated for $C_{12}H_{13}O_6N_5S_2$: C, 37.18; H, 3.38; N, 18.08; S, 16.50; found C, 36.8; H, 3.46; N, 17.5; S, 17.1. It is very little soluble in water or acids, but readily soluble in alkali. However, as the alkaline solutions are not immediately precipitated by dilute acids, the crystallization is very slow.

Example VI

*4,4'-Bis-(biguanyl)-diphenyl-2,2'-disulphonic acid*

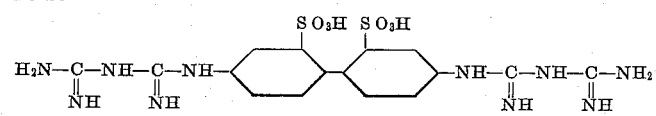

A mixture of 100 parts by weight of benzidine-2,2'-disulphonic acid, 84 parts by weight of dicyandiamide and 1500 parts of water are refluxed with stirring for three hours. After about 25 minutes' boiling the solution becomes clear and approximately one-half hour later a precipitate begins to form. The solution is kept at a pH of 2 to 2.5 (acid to Congo red) by addition of small amounts of dilute mineral acid from time to time. The slurry is cooled to room temperature and the precipitate is filtered off and dried. Yield, about 122 parts by weight. It may be purified by dissolving in dilute hydrochloric acid and reprecipitating by the addition of an equivalent amount of caustic soda solution. The internal salt contains 2 mols water of crystallization. It is soluble in hydrochloric acid and in alkali. Calculated for $C_{16}H_{20}O_6N_{10}S_2,2H_2O$: N, 25.54; S, 11.70; found N, 25.81; S, 11.41.

At the present time, the most important commercial use for the biguanyl sulphonic acids of the present invention is in producing stable diazo compounds which are split by acids into the diazonium salts and biguanyl-sulphonic acids. They can be employed in printing and other dyeing processes where formation of the azo dye takes place in situ on the fibers; for example, in the case of Naphthol AS dyes. An example of the use of one of the biguanyl sulphonic acids of the present invention for stabilizing diazo compounds is as follows: Diazotized-5-nitro orthotoluidine is caused to react with a slightly alkaline solution of 2-biguanyl naphthalene-1-sulphonic acid such as may be obtained by the process of Example III. The compound produced has the following formula:

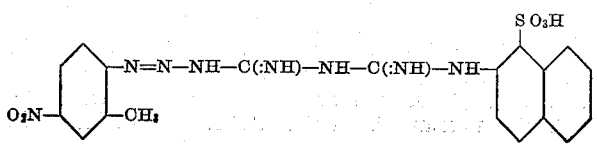

and is a yellowish-brown solid soluble in caustic soda with a dark color. In a similar manner tetrazotized diamines such as benzidine or orthodianisidine may be stabilized. Of course other biguanyl sulphonic acids may be used in place of the naphthalene derivative described above.

Alkaline printing pastes containing such a stabilized diazo or tetrazo compound and a passive coupling component of the enol or phenol type may be printed on cotton. By acid steam, e. g. vapors of formic or acetic acid, the diazo or tetrazo compound is regenerated and couples immediately with the enol or phenol yielding an azo dye. E. G. an alkaline printing paste containing the above formulated derivative of 5-nitro-2-toluidine and the o-toluidide of 2-hydroxy-3-naphthoic acid may be printed on cotton; by treating this print with vapors of acetic acid a Bordeaux azo dyestuff is developed.

I claim:

1. As new products, substances belonging to the group consisting of cyclic biguanyl sulphonic acids, their salts with acids and their salts with bases, the sulphonic acids having the formula

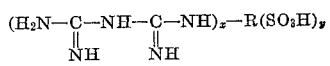

in which R is a cyclic radical of aromatic character free from hydroxyl and free from amino groups, and $x$ is an integer included in the group consisting of 1 and 2 and $y$ is an integer included in the group consisting of 1 and 2.

2. As new products, substances belonging to the group consisting of aromatic biguanyl sulphonic acids, their salts with acids and their salts with bases, the sulphonic acids having the formula

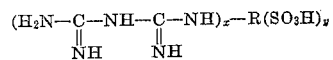

in which R is an aromatic radical free from hydroxyl and from amino groups, and $x$ is an integer included in the group consisting of 1 and 2 and $y$ is an integer included in the group consisting of 1 and 2.

3. As new products, substances belonging to the group consisting of aromatic bis-biguanyl disulphonic acids, their salts with acids and their salts with bases, the sulphonic acids having the formula

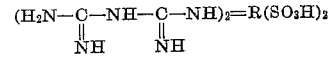

in which R is an aromatic nucleus free from hydroxyl and from amino groups.

4. As a new product 2-biguanyl-naphthalene-1-sulphonic acid having the formula

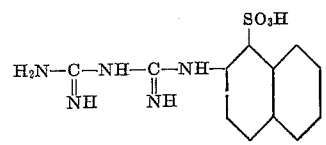

the product forming colorless crystals slightly soluble in cool water and more soluble in hot water, soluble in dilute alkali solution and giving a sparingly soluble hydrochloride.

5. As a new product, the monosodium salt of 1-biguanyl-benzene 2,5-disulphonic acid

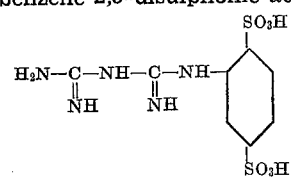

forming colorless crystals and being soluble in alkali.

6. A process for making biguanyl sulphonic acids which comprises bringing about reaction between dicyandiamide and a hydroxyl free amino sulphonic acid of a cyclic radical of aromatic character, the reaction taking place in acid aqueous medium.

7. A process for preparing a hydroxyl free aromatic biguanyl sulphonic acid which comprises bringing about reaction between dicyandiamide and a hydroxyl free aromatic amino sulphonic acid having less than three amino groups, the reaction taking place in acid aqueous medium.

8. A process for producing an aromatic monobiguanyl disulphonic acid which comprises bringing about reaction between dicyandiamide and a compound included in the group consisting of aromatic hydroxyl free monoamino disulphonic acids and their mono salts, the reaction taking place in acid aqueous medium.

9. A process for preparing an aromatic bisbiguanyl disulphonic acid which comprises bringing about reaction between dicyandiamide and a hydroxyl free aromatic diamino disulphonic acid, the reaction being carried out in acid aqueous medium.

10. Process for producing 1-biguanyl-benzene-2,5-disulphonic acid which comprises bringing about reaction between dicyandiamide and aniline 2,5-sulphonic acid in aqueous medium.

11. As new products, substances belonging to the group consisting of aromatic biguanyl monosulphonic acids, their salts with acids and their salts with bases, the sulphonic acids having the formula:

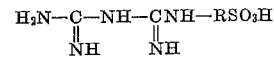

in which R is an aromatic nucleus free from hydroxyl and from amino groups.

12. As new products, substances belonging to the group consisting of aromatic biguanyl disulphonic acids, their salts with acids and their salts with bases, the sulphonic acids having the formula:

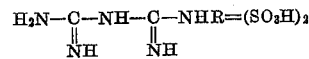

in which R is an aromatic nucleus free from hydroxyl and from amino groups.

13. A process for preparing a hydroxyl free aromatic monobiguanyl monosulphonic acid which comprises bringing about reaction between dicyandiamide and a hydroxyl free aromatic monoamino monosulphonic acid, the reaction taking place in acid aqueous medium.

14. A process for preparing 2 biguanyl-naphthalene 1-sulphonic acid which comprises bringing about reaction between dicyandiamide and 2 amino-naphthalene 1-sulphonic acid in acid aqueous medium.

HANS Z. LECHER.